United States Patent [19]

Yamazaki et al.

[11] 4,057,680

[45] Nov. 8, 1977

[54] METHOD OF POLYMERIZING α-OLEFINS

[75] Inventors: Isamu Yamazaki; Yoichi Toyama, both of Tokyo; Kiwami Hirota, Yokohama; Hisashi Takeuchi, Tokyo, all of Japan

[73] Assignee: Showa Denko Kabushiki Kaisha, Tokyo, Japan

[21] Appl. No.: 713,199

[22] Filed: Aug. 10, 1976

Related U.S. Application Data

[63] Continuation of Ser. No. 295,013, Oct. 4, 1972, abandoned, which is a continuation-in-part of Ser. No. 92,149, Nov. 23, 1970, abandoned.

[30] Foreign Application Priority Data

Mar. 3, 1970 Japan .................................. 45-17663
Nov. 26, 1969 Japan .................................. 44-94256

[51] Int. Cl.² .......................... C08F 4/66; C08F 10/06
[52] U.S. Cl. ................................ 526/142; 252/429 B; 526/122; 526/124; 526/128; 526/132; 526/137; 526/139; 526/140; 526/141; 526/143; 526/349; 526/351; 526/352; 526/906
[58] Field of Search ................................ 526/142, 906

[56] References Cited

U.S. PATENT DOCUMENTS

| | | | |
|---|---|---|---|
| 3,116,274 | 12/1963 | Boehm et al. | 526/142 |
| 3,129,208 | 4/1964 | Jezl et al. | 526/142 |
| 3,178,401 | 4/1965 | Coover et al. | 526/139 |
| 3,219,648 | 11/1965 | Hill | 526/141 |
| 3,530,107 | 9/1970 | Yoshioka et al. | 526/142 |
| 3,573,270 | 3/1971 | Trementozzi et al. | 526/158 |
| 3,701,763 | 10/1972 | Wada et al. | 526/142 |

FOREIGN PATENT DOCUMENTS

| | | |
|---|---|---|
| 1,560,602 | 2/1969 | France. |
| 2,056,749 | 7/1971 | Germany. |
| 2,130,314 | 12/1971 | Germany. |
| 921,954 | 3/1963 | United Kingdom. |
| 1,017,977 | 1/1966 | United Kingdom. |

*Primary Examiner*—Edward J. Smith
*Attorney, Agent, or Firm*—Sherman & Shalloway

[57] ABSTRACT

In the method of polymerizing α-olefins by contacting an α-olefin under polymerization conditions with a stereospecific catalyst comprising a titanium trichloride component and an organoaluminium compound, the improvement wherein said titanium trichloride component is ground during or after contact with a treating agent, said treating agent being selected from at least one of A. an alkylene oxide, and
B. a lactone.

2 Claims, No Drawings

METHOD OF POLYMERIZING α-OLEFINS

This is a continuation of application Ser. No. 295,013, filed Oct. 4, 1972, now abandoned, which is, in turn, a continuation-in-part of application Ser. No. 92,149, filed Nov. 23, 1970, now abandoned.

This invention relates to an improvement of a stereospecific polymerization method for α-olefins, and more particularly to a method for polymerizing α-olefins to give crystalline polymers in high yield using a catalyst system comprising modified titanium trichloride obtained by a specific activating treatment.

The method of polymerizing α-olefins in the presence of a catalyst system comprising a titanium trichloride component and an organoaluminum compound is widely known. It is desirable to increase the crystallinity of the resulting polymer in the stereospecific polymerization of α-olefins thereby to improve its mechanical strength. At the same time, increasing the output of polymer per unit amount of the catalyst is desirable from a commercial standpoint. This is associated not only with a reduction in the amount of catalyst used, but also the omission or simplification of the step of removing the catalyst residue from the resulting polymer as well as increasing the efficiency of the reaction equipment.

Attempts to increase the stereospecificity and activity of a catalyst for polymerization of α-olefins have made from various angles. One typical attempt involves adding a third component to the catalyst to activate it and improve the stereospecificity. A number of substances have been proposed as the third component, as is well known in the art. It is also well known that when an alkylaluminum dihalide or alkylaluminum sesquihalide is used as the organoaluminum component, the catalyst system should necessarily contain the third component, and otherwise, the catalyst system does not show polymerization activity. For example, U.S. Pat. Nos. 3,129,208 and 3,178,401 disclose that lower alkylene oxides and lactones, for instance, are effective as a third component to be added to the titanium trichloride/alkylaluminium sesquihalide system. Another attempt was directed to the improvement of the organoaluminium compound component of the catalyst. Thus, not only trialkyl aluminiums and alkyl aluminum halides, but also various organoaluminium derivatives having an amide, alkoxy, nitrile or inorganic acid group have been proposed. We ourselves discovered that polyolefins are prepared at a very high rate of polymerization using a dialuminoxane, i.e. an organoaluminium compound having a >Al—O—Al< group. Other attempts relate to the modification of titanium trichloride the most important component of the catalyst; the present invention is in the field.

Various methods of modifying titanium trichloride to increase the activity of the catalyst have been proposed, and are widely known. These methods include, for example, grinding titanium trichloride in a ball mill or by some other suitable means, or cogrinding titanium trichloride and a metal halide such as tellurium chloride, aluminium chloride, titanium tetrachloride, titanium dichloride, nickel chloride or lithium chloride to form a solid solution or eutectic crystal. Such titanium trichloride-based component will be referred to as the "titanium trichloride component" for the sake of simplicity.

In spite of these prior proposals, it is difficult to anticipate the method of modifying the titanium trichloride from a generalized theory, because the activity of the titanium trichloride component depends largely on factors such as the delicate physical and chemical conditions of the crystal, the concentration of lattice defect on its surface, the kind and amount of absorbed seed and the degree of agglomeration of crystal particles.

It has now been found that the titanium trichloride component described above can be modified to a surprising extent by contacting it with a specific treating agent and grinding it. A catalyst system comprising such a modified titanium trichloride component gives a polymer of an α-olefin at an increased rate of polymerization, say 10 to 50 % increase and in some instance three times as large as the conventional rate, and the resulting polymer has an increased stereospecificity, for example up to 10% over the conventional one.

Accordingly, an object of the present invention is to provide a method of modifying the titanium trichloride component, and to provide an improved method of producing polymers of α-olefins having good mechanical strength in high yield by using a catalyst system comprising the titanium trichloride component so modified.

In the method of polymerizing α-olefins by contacting an α-olefin under polymerization conditions with a stereospecific catalyst comprising a titanium trichloride component and an organoaluminium compound, the improvement by the present invention comprises using said titanium trichloride component of the catalyst in the state of having been contacted with a treating agent and ground, said treating agent being selected from at least one of (A) an alkylene oxide and (B) a lactone.

As previously stated, while a catalyst system which contains an alkylene oxide or lactone as the third component has been known, it has been totally unknown to contact and grind titanium trichloride with the above-described treating agent thereby to modify it. In comparison with the case of merely adding an alkylene oxide or lactone as the third component, the use of titanium trichloride modified in accordance with the present invention gives rise to strikingly superior effects on the polymerization as will be clearly seen from the results of Comparative Example 1 to be given below.

It has also been known to grind titanium trichloride together with an organophosphorus compound or organic nitrogen compound in order to modify it (French Pat. No. 1,560,602). The present invention has far greater polymerization effects as compared with this prior technique.

It should be noted that there is no common relationship between the effects obtained by the third component merely added to the Ziegler catalyst system as described above and the effects obtained by the treating agent used to modify titanium trichloride. In other words, a compound effective as the third component does not necessarily prove effective as the treating agent, but often gives adverse effects. This will be clear from the results of Comparative Example 2 to be given later.

The method of modifying the titanium trichloride according to the present invention can be applicable to a titanium trichloride obtained by reduction of titanium tetrachloride with aluminium or an organoaluminium compound, or a ground product of such titanium trichloride, both containing aluminum chloride as a solid solution, the former is known as A-type titanium trichloride and the latter is known as AA-type titanium trichloride.

One class of the treating agent for modification in accordance with the method of the present invention is (A) alkylene oxide that may be expressed by the following formula

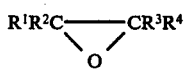

wherein each of $R^1$ to $R^3$ is a hydrogen atom or an alkyl group having not more than 10 carbon atoms, or $R^1$ and $R^3$ together with the ring carbon atoms form a ring of 5 to 12 carbon atoms; $R^4$ is a hydrogen atom, an unsubstituted or halo-substituted alkyl, alkenyl, cycloalkyl or aryl group having not more than 10 carbon atoms, or is a group of formula —$CH_2OR^5$, wherein $R^5$ is an alkyl, alkenyl, aryl or glycidyl group having not more than 10 carbon atoms.

Preferred examples of the alkylene oxide include the following: ethylene oxide, propylene oxide, isobutylene oxide, 2-butene oxide, butadiene monoxide, butadiene dioxide, 1-octene oxide, vinyl cyclohexane oxide, styrene oxide, cyclohexene oxide, epichlorohydrin, allyl glycidyl ether, and diallyl ether dioxide.

Another class of the treating agent used in the invention is (B) lactones. Specifically, the lactones are saturated or unsaturated 4- to 10-membered lactones and lactones of ortho-hydroxyaromatic carboxylic acids, each of them being substituted by an alkyl or alkenyl group. The preferred examples are $\beta$-propiolactone, butyrolactone, $\delta$-valerolactone, coumarine, $\epsilon$-caprolactone, $\delta$-caprolactone, $\gamma$-caprylolactone, $\gamma$-laurolactone, $\gamma$-palmitolactone, $\gamma$-stearolactone, crotolactone, $\alpha$-angelica lactone and $\beta$-angelica lactone.

The treating agents may be used alone or in admixture, and can be contacted with the titanium trichloride component in the form of vapor, liquid or solution or suspension in an inert solvent. During the contacting, the titanium trichloride component does not shown an appreciable change, but since generation of heat is clearly observed, it is assumed that some reaction takes place between the titanium trichloride component and the treating agent. Analysis indicates that the reaction product has incorporated therein the treating agent.

The amount of the treating agent used is suitably 0.01 to 1 mol, preferably 0.02 to 0.5 mol per mol of titanium trichloride. When the amount of the treating agent is less than 0.01 mol, the desired effect cannot be obtained; on the other hand, amounts in excess of one mol do not bring about any particular advantage.

The titanium trichloride component is subjected to grinding during or after contact with the treating agent, said grinding being effected to the same extent as that required to grind titanium trichloride having an $\alpha$- or $\gamma$-crystalline structure to convert it to titanium trichloride having a $\delta$-crystalline structure. This extent of grinding is customarily used in activating A-type $TiCl_3$ ($\alpha$-or $\gamma$-crystals) to form AA-type $TiCl_3$ ($\delta$-crystals). Unless it is ground, the desired modifying effect cannot be obtained. It is desirable that the grinding be performed in an inert atmosphere free from air and moisture at room temperature or at an elevated temperature up to about 200° C, using an impact mill, ball mill, vibratory mill, or other suitable pulverizing means. The extent the titanium trichloride component is modified and activated depends on the degree of grinding. For example, changes in the degree of activation of the titanium trichloride component with grinding time have been examined experimentally by studying the rate of polymerizing propylene, and the results are summarized in Example (A) 14 and Example (B) 18.

The results show that the degree of activating the titanium trichloride component which has been contacted with the treating agent according to the present invention rises sharply for the first 2 hours or so of grinding by a vibratory mill, and then rises slightly and gradually until it reaches a certain constant value. As the modifying effect of the titanium trichloride component depends upon not only the degree of grinding but also the type of the mill used, it is desirable to determine the optimum grinding conditions by preliminary experiments prior to actual commercial practice.

The contacting of titanium trichloride with the treating agents (A) and (B) may be performed at room temperature, but temperatures of 0° to 150° C. may be employed. When using the treating agent (A), it is especially desirable to heat the treated titanium trichloride to 70 to 200° C., preferably 100 to 150° C., and then grind the heated composition. The heating time varies according to the temperature, but usually less than about 3 hours under reduced pressure is sufficient. This results in the removal of volatile by-products and/or the solvent used, and thus gives a further increase in the grinding effect.

Where treating agent (B) is used, a titanium trichloride component can be ground after or during treatment with it.

The catalyst system containing a titanium trichloride component modified in the foregoing manner markedly increases the productivity of $\alpha$-olefin polymers and gives polymers having higher stereospecificity. The catalyst system containing the titanium trichloride component modified with the treating agent (A) is suitable particularly for the production of highly crystalline polypropylene at a high rate of polymerization. The catalyst system containing titanium trichloride modified with the treating agent (B) is suitable for the production of highly crystalline polypropylene.

The polymerization of F$\alpha$-olefins may be performed in accordance with the conventional procedures except that the modified titanium trichloride component is used. These procedures are well known in the art, but will be described briefly below.

The other essential component of the catalyst system is an organoaluminum compound, for example a trialkyl aluminium, dialkyl aluminium halide, alkyl aluminium dihalide, alkyl aluminium sesquihalide, dialkyl aluminium alkoxide, dialkyl aluminium amide, dialkyl aluminium cyanide and a substituted or unsubstituted tetraalkyl dialuminoxane.

The catalyst may contain a third component to improve the stereoregularity; examples are tetrabutylammonium iodide, trimethylsulfonium iodide, pyridine, N,N-dimethylethanolamine, piperidine, methylaniline, trimethylamine, triethylamine, dibutylamine, tributylamine, tetramethylurea, triethylenediamine, diethyleneglycol, dimethylether, dimethylformamide, diethylurethane, diphenylurethane, triphenylphosphine, tributylstibine, triphenylarsine, methylamine, hexaethylmelamine, quinoline, dimethylacetamide, trioctylphosphine, hexamethylphosphortriamide, triethylphosphineoxide, triethylphosphate, tributylphosphite, polymethylsiloxane, tetrakisdimethylaminosilane, trichloroborazol, trisdimethylamino boron, dipyridinozinc chloride, and dipicolinozinc chloride.

As is well known, when the organoaluminum compound is an alkylaluminum dihalide or alkylaluminum sesquihalide, the catalyst system should necessarily contain the third component.

The polymerization temperature is usually 0° to 200° C., preferably 50° 150° C., and the pressure employed is normally 200 atmospheres or below, preferably 1 to 100 atmospheres.

Suitable α-olefins are α-olefins having 2 to 15 carbon atoms, such as ethylene, propylene, butene-1, 3-methylbutene-1, 4-methylpentene-1, hexene, vinyl cyclohexene, styrene, octene, or decene. These olefins may be homopolymerized or copolymerized, or these α-olefins may be copolymerized with diene compounds such as butadiene, isoprene or cyclohexadiene. Furthermore, the polymerization may be carried out in the presence of, for example, hydrogen, halogenated hydrocarbon or diethylzinc, as is well known, to adjust the average molecular weight of the resulting polymer.

The invention is illustrated by the following Examples, wherein the percentages are by weight.

Examples (A) and Examples (B) were performed using the treating agent (A) and treating agent (B), respectively. Table 1 in the Examples (A) shows the conditions for modifying titanium trichloride components, and Table 2 shows the results of olefin polymerization carried out using the modified titanium trichloride components.

EXAMPLE (A) 1

A 300 ml. three-necked flask was thoroughly purged with nitrogen, and charged with about 50 g of titanium trichloride (type AA, product of the Stauffer Company) and 80 ml. of n-heptane. These compounds were cooled with ice, and stirred with a magnetic stirrer. A solution, in 20 ml. of n-heptane, of ethylene oxide in an amount corresponding to 1/10 molar ratio of the titanium trichloride was added dropwise through a dropping funnel. The mixture was heated to 60° C. and maintained at this temperature for 1 hour. The heated mixture was subjected three times to decantation using 50 ml. of n-heptane, and maintained at 5 mmHg and 100° C. for 3 hours. The resulting product was placed in a 1000 ml. stainless steel vibratory ball mill, packed with magnetic balls having a diameter of about 10 mm, within a dry box, and ground for 16 hours.

A 1.5-liter stainless steel, mechanically stirred type autoclave was charged with the titanium trichloride obtained above, triethyl aluminium (TEA for short), tetraethyl dialuminoxane (TEDAO for short), diethyl aluminium monochloride (DEAC for short), and hexamethyl phosphortriamide (HPT for short) in the amounts indicated in Table 2, and 7.5 mols of liquefied propylene. The polymerization or propylene was performed to about one hour at 85° C. A powdery polymer, which had an average rate or polymerization (g/g.hr.) (RR for short) and a residue after extraction with boiling n-heptane (%) (HR for short) as shown in Table 2, was obtained.

For comparison, the foregoing procedure was repeated except that the titanium trichloride was treated with the solvent, heat-treated in vacuo, and ground without adding ethylene oxide (Control 1), and the titanium trichloride was merely ground (Control 2). The results obtained are given in Table 2. The effect of treating the titanium trichloride with ethylene oxide is clear from the results obtained. Such titanium trichloride treated with ethylene oxide is also superior to the commercially available AA-type titanium trichloride (Control 4, commercial grade AA-1, and Control 5, commercial grade AA-2, as shown in Table 2).

EXAMPLES (A) 2 TO 4

The same procedure as set forth in Example (A) 1 was repeated using propylene oxide instead of ethylene oxide and varying the mol ratio of propylene oxide at 1/10, ⅓ and ½ of the titanium trichloride (Examples (A) 2, 3 and 4). The results obtained are given in Table 2, from which it is noted that a greater effect is obtained by using a larger amount of propylene oxide.

EXAMPLE (A) 5

The procedure set forth in Examples (A) 2 to 4 was repeated except the decantation of the heat-treated titanium trichloride component was omitted. From the results shown in Table 2, it is noted that in this case also, treatment with propylene oxide was effective.

control 3

The same procedure as set forth in Example (A) 2 was repeated except that the grinding treatment of the titanium trichloride was omitted. It is seen from the results shown in Table 2 that the polymerization activity of the catalyst used was low.

EXAMPLE (A) 6

The same procedure as set forth in Example (A) 5 was repeated except that the resulting composition treated with the treating agent was heated at 150° C.

EXAMPLES (A) 7 TO 9

The same procedure as set forth in Example A (1) was repeated except that ⅓ molar ratio of epichlorohydrin, 1/10 molar ratio of allyl glycidyl ether, and 1/15 molar ratio of 2-butene oxide, respectively, were used instead of the ethylene oxide. It is noted from Table 2 that better results were obtained than the controls.

Table 1

| Examples (A) | TiCl₃ (amount) | Treating agent (amount) | Solvent (amount) | Treating Conditions | Washing | Heating of resulting composition | Grinding time |
|---|---|---|---|---|---|---|---|
| 1 | AA-type TiCl₃ (50 g) | Ethylene oxide (1/10 molar ratio) | n-heptane (100 ml) | 60° C., 1 hr. | 50 ml, 3 times | 100° C., 5 mmHg 3 hrs. | 16 hrs |
| 2 | " | Propylene oxide (1/10 molar ratio) | " | " | " | " | " |
| 3 | " | Propylene oxide (1/3 molar ratio) | " | " | " | " | " |
| 4 | " | Propylene oxide (1/2 molar ratio) | " | " | " | " | " |
| 5 | " | Propylene oxide (1/10 molar ratio) | " | 30° C., 1 hr. | none | " | " |
| 6 | " | " | n-pentane (100 ml) | 80° C., 1 hr. | none | 150° C., 5 mmHg 3 hrs. | " |
| 7 | " | Epichlorohydrin | n-heptane | 60° c., 1 hr. | 50 ml, | 100° C., 5 mmHg | " |

Table 1-continued

| Examples (A) | TiCl₃ (amount) | Treating agent (amount) | Solvent (amount) | Treating Conditions | Washing | Heating of resulting composition | Grinding time |
|---|---|---|---|---|---|---|---|
| 8 | " | (1/3 molar ratio) Allylglycidyl ether (1/10 molar ratio) | (100 ml) " | " | 3 times " | 3 hrs. " | " |
| 9 | " | 2-butene oxide (1/5 molar ratio) | " | " | " | " | " |
| Control 1 | " | none | " | " | " | " | " |
| Control 2 | " | none | none | none | none | none | " |
| Control 3 | " | Propylene oxide (1/10 molar ratio) | n-heptane (100 ml) | 60° C., 1 hr. | 50 ml, 3 times | 100° C., 5 mmHg 3 hrs. | none |

Table 2

| Examples (A) | Polymerization conditions (I) (TEA 1.5 m mol) | | Polymerization conditions (II) (0.9/0.3/0.05) | | Polymerization conditions (II) (0.9/0.3/0.1) | | Polymerization conditions (IV) (0.9/0.6/0.3) | |
|---|---|---|---|---|---|---|---|---|
| | R R (g/g.hr) | H R (%) | R R (g/g.hr) | H R (%) | R R (g/g.hr) | H R (%) | R R (g/g.hr) | H R (%) |
| 1 | 11,230 | 71.4 | 13,700 | 76.2 | 10,700 | 79.7 | — | — |
| 2 | 13,200 | 71.6 | — | — | 10,400 | 80.1 | 10,600** | 81.6 |
| 3 | 13,480 | 72.3 | — | — | 12,200** | 81.2 | 10,000 | 83.3 |
| 4 | 13,500 | 72.8 | 15,100 | 75.2 | 15,200 | 78.1 | 10,200 | 83.6 |
| 5 | 13,890 | 71.1 | 17,100 | 74.0 | 13,500 | 80.4 | 10,400 | 82.8 |
| 6 | 12,900 | 71.0 | 16,500 | 73.3 | 13,500 | 77.0 | 8,600 | 82.8 |
| 7 | 12,840 | 69.2 | 15,400 | 73.2 | 11,600 | 80.7 | — | — |
| 8 | 12,120 | 68.1 | 12,700 | 74.4 | 10,500 | 80.1 | — | — |
| 9 | 10,250 | 69.7 | 12,200 | 73.6 | 10,200 | 80.2 | — | — |
| Control (A) 1 | 8,130 | 67.9 | — | — | 10,000 | 78.9 | 8,800 | 80.5 |
| 2 | 6,230 | 68.4 | — | — | 6,800 | 79.2 | 6,300 | 78.8 |
| 3 | 6,280 | 68.2 | — | — | 7,600 | 77.7 | — | — |
| 4 | 8,200 | 64.8 | 11,800 | 67.1 | 11,600* | 71.8 | 6,700 | 79.3 |
| [AA(1)] 5 | 7,430 | 67.2 | — | — | 10,400 | 72.9 | 7,600 | 76.9 |
| [AA(2)] | | | | | | | | |

Note:
The figures in the parenthesis under the polymerization conditions (II), (III) and (IV) show the millimols of TEDAO/-DEAC/HPT. The amount of propylene was 0.5 mols and that of titanium trichloride, about 20 mg. Polymerization time: *50 minutes; Polymerization temperature: 85° C.

EXAMPLE (A) 10

An autoclave of the same type as used in Example (A) 1 was charged with 180.2 mg of the titanium trichloride modified in Example (A) 1, 2.5 millimol of diethyl aluminium chloride, and 7.5 mols of liquefied propylene. The polymerization of propylene was performed for one hour at 80° C. There was obtained 259 g of a polymer which had a residue after extraction with boiling n-heptane (HR) of 94.2%.

For the sake of comparison, the foregoing procedure was repeated using 183.0 mg of the titanium trichloride in Control 2. There was obtained 228 g of a polymer having a residue after extraction with boiling n-heptane of 89.1%.

EXAMPLE (A) 11

An autoclave of the same type as used in Example (A) 1 was charged with 0.215 g of the titanium trichloride modified in Example (A) 1, 7.5 millimols of ethyl aluminium dichloride, 3.6 millimols of tri-n-butylamine, 7.5 mols of liquefied propylene, and 0.2 mol %, based on the propylene, of hydrogen. The polymerization of propylene was performed for 1 hour at 80° C. After removal of unreacted propylene, 100 ml. of isobutyl alcohol was added to treat the product for 30 minutes at 80° C., followed by filtration and drying at reduced pressure to form 121 g of polypropylene which had a residue after extraction with boiling n-heptane of 94.4%.

For comparison, the foregoing procedure was repeated using 0.203 g of the titanium trichloride of Control 1. There was obtained 98 g of polypropylene having a residue after extraction with boiling n-heptane of 94.0%.

EXAMPLE (A) 12

An autoclave of the same type as used in Example (A) 1 was charged with 0.228 g of the titanium trichloride modified in Example (A) 1, 2.0 millimols of diethyl aluminium-ε-caprolactam, 4.0 millimols of ethyl aluminium dichloride, 7.5 mols of liquefied propylene, and 0.2 mol %, based on the propylene, of hydrogen. The polymerization of propylene was performed for one hour at 82.5° C. The resulting polymer was refined, and dried to give 136 g of polypropylene having a residue after extraction with boiling n-heptane of 93.6%.

The comparison, the foregoing procedure was repeated using 0.214 g of the titanium trichloride a Control 1. There was obtained 111 g of polypropylene which had a residue after extraction with boiling n-heptane of 92.8%.

EXAMPLE (A) 13

A 1-liter autoclave was charged with 108 mg of the modified titanium trichloride of Example (A) 2, 2.5 millimols of tri-isobutyl aluminium and 600 ml. of isopentane. Ethylene was introduced under pressure with stirring at 80° C. While the partial pressure of ethylene was being maintained at 5 kg/cm², the polymerization of ethylene was performed for 60 minutes. There was obtained 213 g of high density polyethylene.

For comparison, the foregoing procedure was repeated except that non-modified titanium trichloride (110 mg) was used. There was obtained 124 g of a polymer. It is seen that the modification treatment of the titanium trichloride component results in a threefold increase in the rate of polymerizing ethylene.

EXAMPLE (A) 14

AA-type titanium trichloride was treated under the treating conditions set forth in Example (A)-3 for varying time of grinding, using 1/5 mol, based on the titanium trichloride, of propylene oxide. The polymerization was performed under the polymerization conditions III in Example (A)-3. The control is the case where the titanium trichloride component is ground without being contacted with the treating agent. The results were as follows:

| Grinding time (hours) | Rate of polymerizing propylene ($g/g.TiCl_3/hr.$) | |
|---|---|---|
| | Treated with propylene oxide | Control |
| 0 | 5,000 | 8,800 |
| 5 | 10,700 | 9,000 |
| 10 | 12,000 | 9,100 |
| 15 | 12,500 | 9,300 |
| 20 | 13,000 | 9,400 |
| 30 | 13,500 | 9,500 |
| 40 | 13,700 | 10,000 |
| 50 | 13,800 | 10,100 |

EXAMPLE (B) 1

Within a nitrogen-purged dry box, a 1,000 ml. stainless steel ball mill vessel packed with 600 ml. of magnetic balls having a diameter of about 10 mm was charged with a mixture of 60 g of AA-type titanium trichloride and 8.9 g (corresponding to 1/3 molar ratio of the titanium trichloride) of γ-butyrolactone, and the ball mill vessel was sealed. The ball mill vessel was withdrawn from the dry box, and mounted on a vibratory grinder. The mixture was ground for 17.5 hours at room temperature.

A 1.5-liter mechanically stirred stainless steel autoclave was charged with 23.8 mg of the modified titanium trichloride obtained above, 0.9 millimol of tetraethyl dialuminoxane, 0.6 millimol of diethyl aluminium chloride, 0.3 millimol of hexamethyl phosphortriamide, and 7.5 mols of liquefied propylene. The polymerization of propylene in the absence of a solvent was performed for 60 minutes at 85° C. There was obtained 250 g of a white powdery polymer, which had an average rate of polymerization of 10,500 g/g AATiCl$_3$. hr and a residue after extraction with boiling n-heptane of 82.4%.

For comparison, the foregoing procedure was repeated except that a titanium trichloride component which was merely ground was used. There was obtained a polymer having an average rate of polymerization of 8,000 g/g.hr and a residue after extraction with boiling n-heptane of 73.4%.

It is seen from this comparison that the use of titanium trichloride modified with γ-butyrolactone led to a 31.2% increase in polymerization activity and a 9.0% increase in stereoregularity.

EXAMPLE (B) 2

The polymerization of propylene in the absence of a solvent was performed for 1.5 hours at 80° C. in the presence of 0.15 mol % hydrogen by the procedure set forth in Example (B) 1, using a catalyst composed of 0.22 g of the titanium trichloride modified in Example (B) 1, 7.5 millimols of ethyl aluminium dichloride and 5.3 millimols of tri-n-butylamine. The resulting polymer was treated with 500 ml. of isobutanol for 0.5 hour at 70° C. to solubilize the catalyst, followed by filtration and drying to yield 245 g of a white polymer, which had an average rate of polymerization of 744 g/g AA-TiCl$_3$.hr. To the polymer obtained was added 0.2% of 2,6-di-tertbutyl-4-methyl-phenol as stabilizer, and the mixture was molded for 5 minutes at 230° C. at a pressure of 50 kg/cm$^2$. A sample taken from the molded product exhibited a melt viscosity index of 8.2 g/10 minutes (230° C., a load of 2.16 g), a flexural rigidity (ASTM D 747-61T) of 18.1 × 10$^4$ psi and a yield strength (ASTM D638-58T) of 344 kg/cm$^2$.

Propylene was polymerized in the same manner as mentioned above using titanium trichloride not modified with γ-butyrolactone. The resulting polymer had an average rate of polymerization of 600 g/g.hr, and a flexural strength of 15.8 × 10$^4$ psi and a yield strength of 314.6 kg/cm$^2$. These figures clearly show the effect of the modified titanium trichloride.

EXAMPLE (B) 3

An autoclave of the same type as used in Example (B) 1 was charged with 0.225 g of the modified titanium trichloride of Example (B) 1, 3.0 millimols of diethyl aluminium chloride, and 100 ml. of isopentane. Subsequently, 200 g of liquefied butene-1 was charged to the autoclave, and polymerized with stirring for one hour at 80° C. After removal of unreacted monomer and solvent by volatilization, the resulting polymer was washed with 500 ml. of isobutanol at 70° C. for 0.5 hour, and dried. There was obtained 121 g of polybutene-1 which had a residue after extraction with boiling ether of 75.2%.

For comparison, the same procedure as mentioned above was repeated except that 0.230 g of non-modified titanium trichloride was used. There was obtained 82 g of polybutene-1 which had a residue after extraction with boiling ether of 65.5%.

EXAMPLES (B) 4 to 5

A 300 ml. nitrogen-purged three-necked flask was charged with 50 g of AA-type titanium trichloride and 100 ml. of n-heptane, and, with stirring at room temperature, a solution, in 30 ml. of toluene, of γ-butyrolactone [Example (B) 4] or ε-caprolactone [Example (B)]5 was added dropwise. The mixture was then maintained at 60°–70° C. for one hour to complete the reaction. The supernatant liquid was removed by decantation, and the titanium trichloride was then washed two times with 100 ml. of n-heptane. The solvent was volatilized for 3 hours at 150° C., and the resulting product was dried. The titanium trichloride so treated was charged to a vibratory ball mill of the same type as used in Example (B) 1, and ground for 16 hours.

The polymerization of propylene was performed at 82.5° C. in the presence of 0.2 mol % of hydrogen in the same manner as set forth in Example (B) 2 using a catalyst composed of 0.18 g of the titanium trichloride so modified, 1.88 millimols of diethyl aluminium-ε-caprolactam and 3.76 millimols of ethyl aluminium dichloride. The results obtained are shown in Table 3 below together with those of the comparison in which the treating agent was not used.

Table 3

| Example | (B) 4 | (B) 5 | Comparison |
|---|---|---|---|
| Treating agent | γ-butyrolactone | ε-caprolactone | — |
| Average rate of polymerization (g/g of TiCl₃/hr.) | 425 | 405 | 335 |
| Properties of polymer | | | |
| Density (g/cc) | 0.9035 | 0.9031 | 0.9030 |
| Flexural rigidity (psi) | $16.8 \times 10^4$ | $17.4 \times 10^4$ | $15.7 \times 10^4$ |
| Melt viscosity index | 8.80 | 9.01 | 7.88 |

EXAMPLES (B) 6 to 15

AA-type or A type titanium trichloride was treated with a treating agent of various kinds as indicated in Table 4 under the conditions described in Examples (B) 4 to 5, and ground for 17.5 hours in an impact mill to form a modified titanium trichloride.

Using a catalyst composed of 150 mg of the titanium trichloride so modified, 3.75 millimol of diethyl aluminium monochloride, propylene was polymerized for 60 minutes at 80° C. by the procedure of Example (B) 1. The results obtained are given in Table 4 together with those of the comparison in which the titanium trichloride was not treated with the treating agent according to the present invention.

Table 4

| Examples (B) | Treating agent | Molar ratio of treating agent/TiCl₃ | Yield of polymer (grams) | Heptane-insoluble portion (%) |
|---|---|---|---|---|
| 6 | β-propiolactone | 1/3 | 213 | 95.1 |
| 7 | ε-caprolactone | 1/3 | 237 | 96.3 |
| 8 | γ-nonalactone | 1/3 | 220 | 94.2 |
| 9 | γ-valerolactone | 1/3 | 224 | 94.8 |
| 10 | coumarine | 1/3 | 231 | 93.4 |
| 11 | γ-butyrolactone | 1/3 | 262 | 97.7 |
| 12 | " | 1/4 | 249 | 97.3 |
| 13 | " | 1/10 | 242 | 97.1 |
| 14 | " | 1/20 | 234 | 96.4 |
| 15* | " | 1/3 | 256 | 97.2 |
| Comparison | — | — | 192 | 89.1 |

*A-type titanium trichloride

EXAMPLE (B) 16

A 1-liter autoclave was charged with 105 mg of titanium trichloride modified in Example (B) 1, 2.5 millimols of tetraethyl dialuminoxane and 600 ml. of isopentane, and with stirring at 75°–30° C., ethylene was introduced at a partial pressure of 5 kg/cm². While the partial pressure was being maintained at this value, ethylene was polymerized for 60 minutes. After completion of the polymerization, unreacted ethylene was removed, and the resulting polymer was washed with isobutanol, followed by drying under vacuum to yield 147 g of high density polyethylene.

For comparison, the foregoing procedure was repeated except that untreated titanium trichloride was used. There was obtained 112 g of a polymer.

EXAMPLE (B) 17

The polymerization of propylene was performed by the procedure set forth in Example (B) 1 using a catalyst composed of 28.9 mg of the modified titanium trichloride produced in Example (B) 1, 0.75 millimol of tetraethyl dialuminoxane, 2.0 millimols of ethyl aluminium dichloride and 1.3 millimols of hexamethyl phosphortriamide and adding 0.3 millimol of diethylzinc and hydrogen at a partial pressure of 1.5 kg/cm² for molecular weight adjustment. The polymerization was continued for 1 hour at 85° C. to yield 222 g of polypropylene having an average rate of polymerization of 7,700 g/g.hr and a heptane-insoluble portion of 90.1%. It had a melt viscosity index of 2.9 g/10 minutes. To the resulting powdery polymer was added 0.1% of Irganox stabilizer, and the mixture was kneaded for 3 minutes at 170°–185° C. The kneaded product was press-molded at 230° C. It was found that the molded product has a yield strength of 302 kg/cm², a break strength of 323 kg/cm², an elongation of 900%, and a flexural rigidity of $12.2 \times 10^4$ psi.

EXAMPLE (B) 18

When grinding the titanium trichloride with a treating agent in accordance with the invention, the effects of grinding time on the polymerization were studied. One part by weight of commercially available titanium trichloride (AA-type) and 0.14 part by weight of γ-butyrolactone were ground together by a vibratory mill. The treating conditions were as set forth in Example (B)-1. Using a catalyst system consisting of 1 mmol of the treated titanium trichloride and 3.5 mmol of diethylaluminumchloride, the polymerization of propylene was carried out. The polymerization conditions were as in Example (A)-1, and the hydrogen concentration in the reaction system was maintained at 0.12 mole %. The relationships between the grinding time for titanium trichloride and γ-butyrolactone, and the results of the polymerization were as follows.

| Grinding time (hour) | Result of polymerization | |
|---|---|---|
| | RR | HR |
| 0 | 820 | 89.3 |
| 2 | 1,410 | 96.7 |
| 4 | 1,580 | 97.9 |
| 6 | 1,640 | 97.8 |
| 12 | 1,695 | 96.8 |
| 18 | 2,030 | 98.3 |
| Control (γ-butyrolactone not used) | 1,290 | 89.0 |

When grinding the titanium trichloride together with γ-butyrolactone, variation of infrared absorption spectrum with the passage of grinding time was studied. From the infrared absorption spectrum, the absorption at the wavelength υ c = 0 (1764 cm⁻¹) based on the carbonyl group of free γ-butyrolactone almost disappears after the grinding time of 1 hour, and instead there appear the absorptions at the wavelength υ c = 0 (1645 cm⁻¹) coordinated to titanium trichloride and at the wavelengths of 1568 cm⁻¹ and 1454cm⁻¹ based on the carbonyl group (coordinated to titanium trichloride) of γ-butyrolactone ring-opened by detaching chlorine from titanium trichloride. As the grinding time passes, the absorption at the wavelengths of 1568 cm⁻¹ and 1454 cm⁻¹ considered to be based on the product in which butyrolactone is ring-opened, increases and which absorption after the grinding of 6 hours becomes dominant of all. Thus it will be clear that γ-butyrolactone ground together with titanium trichloride changes its original structure.

On the other hand, it was discovered by means of X-ray analysis that the crystalline structure of titanium trichloride changes with the passage of grinding time. Radical variations of titanium trichloride crystals in the "$a$" and "$c$" axis directions will be recognized with the passage of grinding time. In particular, in the "$a$" axis direction, since the peak of X-ray shifts down to the lower angles side with passage of time, it could be considered that the crystalline latice is extending toward the "$a$" axis. Grinding of titanium trichloride of the AA-type without using γ-butyrolactone, causes the peak to be somewhat broad, but variations such as those as discussed above are not recognizable.

It is considered that the chemical bonding to titanium trichloride effected by the ring-opening of γ-butyrolactone caused by the grinding of titanium trichloride and γ-butyrolactone and the accompanying change of crystalline structure of titanium trichloride might have been substantially contributing to the improvement of catalyst activity and the isotacticity of the polymer obtained.

COMPARATIVE EXAMPLE 1

Using the catalyst systems disclosed in Table 5, the polymerization of propylene was carried out. The polymerization conditions were as set forth in Example (A)-1. In Table, "Control" represents a catalyst system consisting of titanium trichloride and an aluminum compound containing no promoter, and "Comparison" represents the catalyst system of the above Control but containing γ-butyrolactone or propylene oxide as a promoter. "The Invention" represents a catalyst system which makes use of titanium trichloride treated with γ-butyrolactone or propylene oxide in accordance with the invention. Said treating method is as described in Example (B)-1 and Example (A)-1.

Table 5-1

|  | Catalyst System | | | Result | |
| --- | --- | --- | --- | --- | --- |
|  | Ti-Component | Al-Component | Promoter | RR | HR |
| Control | Titanium trichloride (0.1 m mol) | Triethylaluminum (1.5 m mol) | — | 8,200 | 64.8 |
| Comparison | " | " | γ-Butyrolactone (0.03 m mol) | 7,430 | 67.2 |
| " | " | " | Propylene oxide (0.02 m mol) | 8,320 | 65.1 |
| The Invention | Titanium trichloride (0.1 m mol) treated with γ-butyrolactone (0.03 m mol) | " | — | 12,100 | 74.4 |
| " | Titanium trichloride (0.1 m mol) treated with propylene oxide (0.02 m mol) | " | — | 11,300 | 72.2 |

Table 5-2

|  | Catalyst System | | | Result | |
| --- | --- | --- | --- | --- | --- |
|  | Ti-Component | Al-Component | Promoter | RR | HR |
| Control | Titanium trichloride (1 m mol) | Diethylaluminum-chloride (3 m mol) | — | 1,290 | 89.0 |
| Comparison | " | " | γ-Butyrolactone (0.3 m mol) | 820 | 89.3 |
| " | " | " | Propylene oxide (0.2 m mol) | 834 | 88.1 |
| The Invention | Titanium trichloride (1 m mol) treated with γ-butyrolactone (0.3 m mol) | " | — | 1,670 | 97.6 |
| " | Titanium trichloride (1 m mol) treated with propylene oxide (0.2 m mol) | " | — | 1,387 | 92.6 |

Table 5-3

|  | Catalyst System | | | Result | |
| --- | --- | --- | --- | --- | --- |
|  | Ti-Component | Al-Component | Promoter | RR | HR |
| Control | Titanium trichloride (2 m mol) | Ethylaluminumdichloride (4 m mol) complexed with tributylamine (3 m mol) | — | 660 | 94.1 |
| Comparison | " | " | γ-Butyrolactone (0.6 m mol) | 413 | 92.7 |
| " | " | " | Propylene oxide (0.4 m mol) | 538 | 93.4 |
| The Invention | Titanium trichloride (2 m mol) treated with γ-butyrolactone (0.6 m mol) | " | — | 872 | 97.9 |
| " | Titanium trichloride (2 m mol) treated with propylene oxide (0.4 m mol) | " | — | 720 | 95.3 |

COMPARATIVE EXAMPLE 2

Using titanium trichloride ground together with each one of the below-given seven treating agents as a component of catalyst system, the polymerization of propylene was performed. These compounds used as treating agents were selected from those known so far as promoters for Ziegler-type catalysts. The same method as set forth in Example (A) 1 was effected to treat the titanium trichloride with said treating agents, thereby adjusting the molar ratio of treating agent to titanium trichloride to be as follows.

| Treating agent | Molar ratio of the agent/Ti |
|---|---|
| Monoethylamine | 1/10 |
| Tetrahydrofuran | 1/10 |
| N,N-dimethyl formamide | 1/5 |
| Sodium amide | 1/5 |
| Acetic acid | 1/10 |
| Ethylacetate | 1/10 |
| Phosphorus oxychloride | 1/5 |

The following three kinds of catalyst systems were used:

| | | |
|---|---|---|
| (a) | The treated titanium trichloride | 0.06 m mol. |
| | Tetraethyldialuminoxane | 0.9 |
| | Diethylaluminum chloride | 0.3 |
| | Hexamethylphosphortriamide | 0.1 |
| (b) | The treated titanium trichloride | 0.9 |
| | Diethylaluminum chloride | 3.5 |
| (c) | The treated titanium trichloride | 1.1 |
| | Ethylaluminumdichloride | 7.5 |
| | Tributylamine | 5.6 |

The polymerization was carried out as set forth in Example (A)-1. That is, the polymerization was carried out in 7.5 mols of liquefied propylene at a temperature of 85° C for one hour without the presence of any other solvent. The polymerizations which employ the catalyst systems of (b) and (c) were performed in the presence of hydrogen (hydrogen concentration in the reaction system, 0.12 mole %) as a chain transfer agent. Corresponding to the above-mentioned three kinds of catalyst systems, the three control runs were carried out, whereby using a non-treated titanium trichloride. The rate of polymerization (g/g.hr), (RR), and the residue of extraction with boiling n-heptane (%) in the formed polypropylene, (HR), resulting from the above-mentioned propylene polymerization were as listed in Table 6 below.

Table 6

| | | Catalyst system | | | | | |
|---|---|---|---|---|---|---|---|
| | | (a) | | (b) | | (c) | |
| No. | Treating agent | RR | HR | RR | HR | RR | HR |
| 1 | Monoethylamine | 7,420 | 65.3 | 822 | 89.6 | 614 | 94.2 |
| 2 | Tetrahydrofuran | 8,660 | 67.9 | 1,030 | 90.2 | 602 | 94.0 |
| 3 | N,N-dimethylformamide | 8,130 | 66.1 | — | — | 672 | 93.1 |
| 4 | Sodium amide | — | — | 914 | 86.2 | 520 | 91.8 |
| 5 | Acetic acid | 7,220 | 68.3 | 726 | 87.5 | 544 | 92.1 |
| 6 | Ethylacetate | 9,400 | 69.6 | 1,027 | 89.3 | — | — |
| 7 | Phosphorus oxychloride | 9,210 | 60.2 | — | — | — | — |
| Control | none | 11,400 | 69.0 | 1,290 | 89.0 | 660 | 94.1 |

Titanium trichloride ground with the above-mentioned 7 kinds of compounds, if compared with the non-treated titanium trichloride, does not show an appreciable amount of improvement in the polymerization of propylene, but in most cases shows rather adverse effects.

What we claim is:

1. In a method of polymerizing alpha-olefins and styrene by contacting an alpha-olefin or styrene under polymerization conditions with a stereospecific catalyst comprising (a) a titanium trichloride component containing aluminum chloride as a solid solution and (b) an organo-aluminum compound, the improvement consisting of subjecting said titanium trichloride component to grinding during or after contact with a treating agent for a period of from about 5 to 50 hours in an impact, ball or vibratory mill, and in an inert atmosphere at a temperature of from room temperature to about 200° C., said treating agent being a lactone selected from beta-propiolactone, gamma-butyrolactone, gamma-valerolactone, gamma-nonalactone, epsilon-caprolactone, and coumarine, and said titanium trichloride being contacted with said treating agent so that 0.01–1 mol of said treating agent is incorporated in 1 mol of said titanium trichloride.

2. The method according to claim 1 wherein said organo-aluminum compound is selected from triethyl aluminum, triisobutyl aluminum, diethyl aluminum chloride, ethyl aluminum dichloride, diethyl aluminum-ε-caprolactam and tetraethyl dialuminoxane.

* * * * *